(12) United States Patent
Kuhnert

(10) Patent No.: US 9,972,979 B2
(45) Date of Patent: May 15, 2018

(54) PRECHAMBER SPARK PLUG FOR IGNITING A FUEL-AIR MIXTURE IN AN INTERNAL COMBUSTION ENGINE

(71) Applicant: DKT Verwaltungs-GmbH, Sinsheim (DE)

(72) Inventor: Steffen Kuhnert, Heidelberg (DE)

(73) Assignee: DKT Verwaltungs-GmbH, Sinsheim (DE)

( * ) Notice: Subject to any disclaimer, the term of this patent is extended or adjusted under 35 U.S.C. 154(b) by 0 days. days.

(21) Appl. No.: 15/538,884

(22) PCT Filed: Nov. 30, 2015

(86) PCT No.: PCT/DE2015/200522
§ 371 (c)(1),
(2) Date: Jun. 22, 2017

(87) PCT Pub. No.: WO2016/146092
PCT Pub. Date: Sep. 22, 2016

(65) Prior Publication Data
US 2017/0358906 A1 Dec. 14, 2017

(30) Foreign Application Priority Data
Mar. 17, 2015 (DE) .................. 10 2015 204 814

(51) Int. Cl.
*H01T 13/54* (2006.01)
*H01T 13/32* (2006.01)
*H01T 13/39* (2006.01)

(52) U.S. Cl.
CPC .............. *H01T 13/54* (2013.01); *H01T 13/32* (2013.01); *H01T 13/39* (2013.01)

(58) Field of Classification Search
None
See application file for complete search history.

(56) References Cited

U.S. PATENT DOCUMENTS

| 5,554,908 A | 9/1996 | Kuhnert et al. |
| 7,011,560 B2 | 3/2006 | Downs et al. |

(Continued)

FOREIGN PATENT DOCUMENTS

| DE | 10326269 A1 | 1/2005 |
| DE | 102010032412 A1 | 2/2012 |

(Continued)

OTHER PUBLICATIONS

International Searching Authority, International Search Report (ISR) and Written Opinion for International Application No. PCT/DE2015/200522, dated May 2, 2016, 10 pages, European Patent Office, Netherlands.

(Continued)

*Primary Examiner* — Ashok Patel
(74) *Attorney, Agent, or Firm* — Alston & Bird LLP

(57) ABSTRACT

A pre-chamber spark plug for igniting a fuel-air mixture in an internal combustion engine, in particular a gasoline engine, comprises a spark plug body (1) having a pre-chamber housing (2) and a cap (4) which at least partially closes the pre-chamber (3), and further comprises a ground electrode (11) in the spark plug body (1) as well as a central electrode (7) which protrudes into the pre-chamber (3); the ground electrode (11) has an annular shape and, on the inner surface thereof, includes at least one ignition area (17) designed as a cam (16) as well as a radially inward extending protrusion (18) as a baffle (19).

20 Claims, 6 Drawing Sheets

(56) References Cited

U.S. PATENT DOCUMENTS

| | | | |
|---|---|---|---|
| 2007/0069617 A1* | 3/2007 | Tozzi | F02B 19/08 |
| | | | 313/140 |
| 2009/0309475 A1* | 12/2009 | Tozzi | F02B 19/08 |
| | | | 313/143 |
| 2011/0062850 A1 | 3/2011 | Tozzi | |
| 2012/0125279 A1* | 5/2012 | Hampson | H01T 13/54 |
| | | | 123/169 R |
| 2012/0125287 A1* | 5/2012 | Chiera | F02B 19/12 |
| | | | 123/254 |
| 2016/0254650 A1* | 9/2016 | Maul | H01T 13/32 |
| | | | 123/169 EL |
| 2017/0104316 A1* | 4/2017 | Niessner | H01T 13/54 |

FOREIGN PATENT DOCUMENTS

| | | |
|---|---|---|
| DE | 102012202335 A1 | 8/2013 |
| EP | 0675272 A1 | 10/1995 |
| WO | WO 2007/092972 A1 | 8/2007 |

OTHER PUBLICATIONS

The International Bureau of WIPO, International Preliminary Report on Patentability Chapter 1 (English translation of the Written Opinion) for International Application No. PCT/DE2015/200522, dated Sep. 19, 2017, 5 pages, Switzerland.

\* cited by examiner

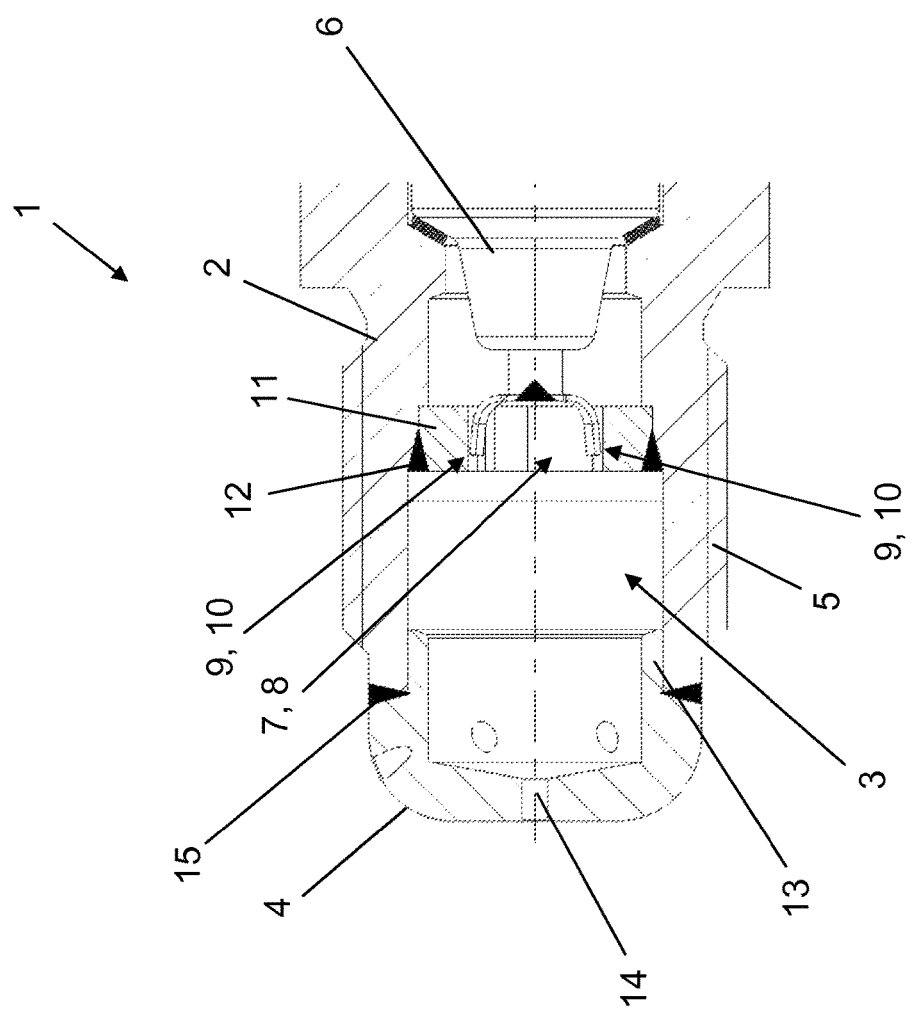

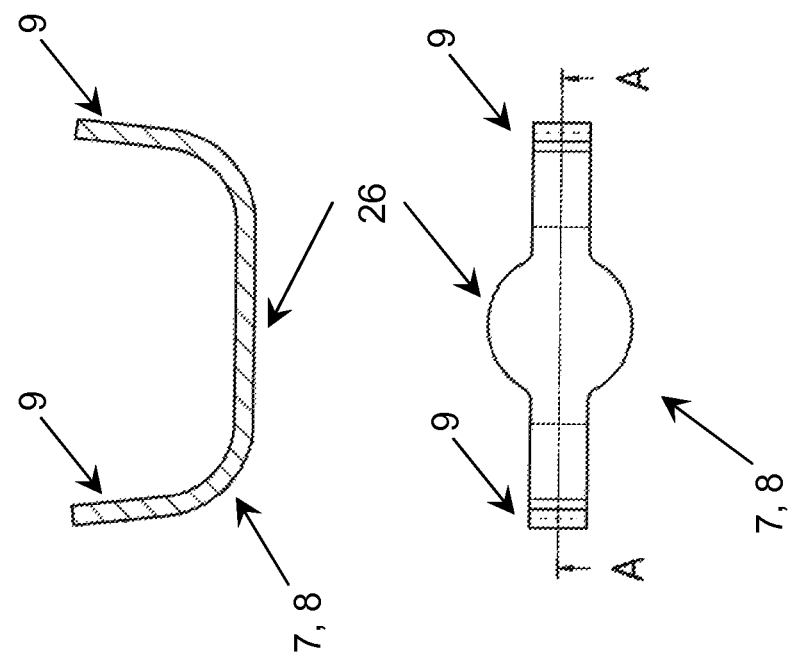
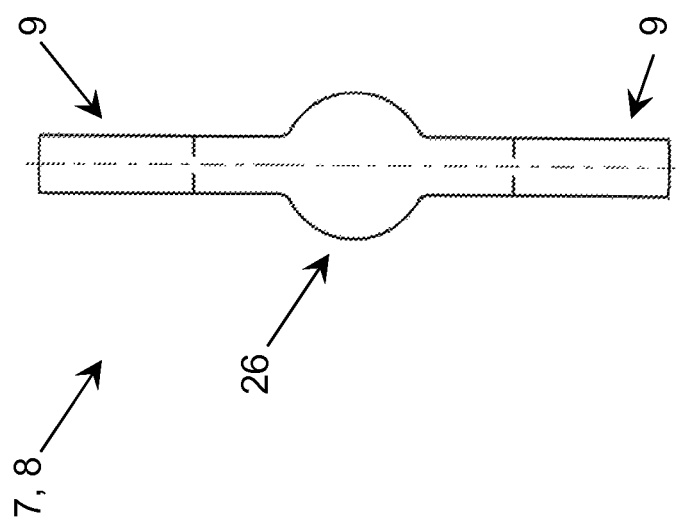
Fig. 9

PRECHAMBER SPARK PLUG FOR IGNITING A FUEL-AIR MIXTURE IN AN INTERNAL COMBUSTION ENGINE

CROSS REFERENCE TO RELATED APPLICATIONS

This application is a national stage application, filed under 35 U.S.C. § 371, of International Application No. PCT/DE2015/200522, filed Nov. 30, 2015, which claims priority to German Application No. 10 2015 204 814.4, filed Mar. 17, 2015, the contents of both which as are hereby incorporated by reference in their entirety.

BACKGROUND

Technical Field

The invention relates to a pre-chamber spark plug for igniting a fuel/air mixture in an internal combustion engine, in particular, a gasoline engine.

Pre-chamber spark plugs of the type under discussion have been known for a long time from the field. Pre-chamber spark plugs are special spark plugs that are designed for internal combustion engines and that function in accordance with the principle of lean combustion. Pre-chamber spark plugs have a pre-chamber that interacts with the combustion chamber of an internal combustion engine by means of transfer openings. The fuel/air mixture is ignited by an ignition spark in the pre-chamber, after which the combustion proceeds in the form of ignition flares through the transfer openings into the combustion chamber of the internal combustion engine, where the lean mixture, which tends to be unwilling to ignite, ignites.

Description of Related Art

A pre-chamber spark plug is known, for example, from WO 2007/092972 A1. This pre-chamber spark plug comprises a pre-chamber that is provided with a pre-chamber wall and a cover surface. The pre-chamber wall comprises a cylindrical part with rectangular ground electrode carriers, to which the ground electrodes are attached. In this case the ground electrode carriers are designed as an integral component of the cylindrical part or are securely welded thereto. The ground electrodes are assigned rectangular center electrodes, which are attached to a central center electrode carrier. This arrangement allows multiple pairs of igniting surfaces to be created, by means of which an ignition, which is as centralized as possible in relation to the pre-chamber, is supposed to take place.

The problem with the prior art pre-chamber spark plug is that it has a large number of individual parts and has, therefore, an extremely complex design and, as a result, is expensive to manufacture. Another disadvantage is that the igniting characteristics of the prior art pre-chamber spark plug are insufficient, an aspect that reduces the efficiency.

BRIEF SUMMARY

Therefore, the present invention is based on the object of designing and further developing a pre-chamber spark plug of the type mentioned at the outset in such a way that the igniting characteristics and, therefore, the efficiency are improved with simple structural means.

The aforementioned engineering object is achieved, according to the invention, by means of the features disclosed in the pending claims.

It has been found in an inventive manner that the engineering object, on which the invention is based, can be achieved in a surprisingly simple way by means of a clever configuration of the ground electrode. For this purpose the ground electrode is designed so as to be ring shaped, so that regardless of the number of igniting surfaces that are produced, only a single component has to be provided in order to produce the ground electrode. In addition, by designing the ground electrode as a ring-shaped element, the inside diameter of the pre-chamber in the area of ignition is decreased in an ideal way. This decrease in the inside diameter induces an increase in the swirl of the fuel/air mixture and, consequently, also an increase in the flow velocity in the ignition area. The result is that a rapid flame propagation is produced after formation of the flame kernel, so that the igniting characteristics and, hence, the efficiency are significantly improved.

In order to further improve the igniting characteristics, the ground electrode may be made of nickel or a nickel-based alloy or may be coated with nickel or a nickel-based alloy. In particular, when designing a ground electrode made of nickel or a nickel-based alloy, it is necessary to provide an effective heat dissipation on account of the high thermal conductivity of these materials. As a result, fewer so-called "hot spots" are generated in the pre-chamber; and the tendency of the engine to knocking combustion or glow ignition is minimized.

With respect to the housing of the pre-chamber, it is conceivable that this housing is made of steel. Furthermore, an external thread can be formed on the outer periphery of the pre-chamber housing in order to attach the pre-chamber spark plug in a corresponding spark plug thread of an internal combustion engine. An insulator, for example, a ceramic insulator, which insulates the center electrode from the ground electrode, can be inserted in the pre-chamber housing. With respect to the cap, it is conceivable that it is made of nickel or a nickel-based alloy or is coated with nickel or a nickel-based alloy.

In order to enable a particularly simple and, therefore, cost-effective production of the pre-chamber spark plug, the ground electrode can be connected to the pre-chamber housing in a positive and/or non-positive manner. In this respect it is conceivable that the ground electrode is welded, pressed, shrunk and/or screwed into the pre-chamber housing.

The ground electrode has at least one igniting surface, which is designed as a cam, on the inner lateral surface. This structural measure enables the flame to propagate in the shape of a sphere, as soon as a stable flame kernel is formed. This leads to a more rapid flame propagation and, hence, to a more rapid combustion of the fuel/air mixture, as a result of which the efficiency increases, and the flame is prevented from extinguishing on the cold wall. At the same time it is conceivable that, for example, four cams, i.e., four igniting surfaces, are provided on the ground electrode.

In order to extend the life of the cam acting as an igniting surface, a reinforcement made of precious metal can be disposed on said igniting surface or, more specifically, said cam. The precious metals that may be used are, for example, platinum, iridium or a platinum-based alloy or an iridium-based alloy. Owing to the higher melting point of these materials compared to pure nickel, the life of the pre-chamber spark plug is maximized while at the same time ensuring ideal igniting characteristics.

In this case it is conceivable that the reinforcement is designed as a plate. The plate may be connected to the cam in a positive and/or non-positive manner. In particular, the plate can be welded to the cam. If multiple cams are formed, then each of the cams may have a corresponding plate as the reinforcement.

As an alternative, it is conceivable that the reinforcement is designed as a rivet, where in this case the rivet is disposed in a passage of the ground electrode in a positive and/or non-positive manner. For example, the rivet can be pressed or shrunk into the passage and/or can be fixed by means of a spot weld disposed on the outer lateral surface of the ground electrode. In this embodiment it is also possible in the case of a ground electrode having a plurality of cams that each of the cams has a rivet as the reinforcement.

In order to further improve the igniting characteristics, the ground electrode has a radially inwards extending projection on the inner lateral surface as a flow shield. The projection may have an asymmetric geometry, for example, in the form of a spoiler. The flow shield makes it possible to reduce the flow velocity of the fuel/air mixture specifically in the area, in which a spark is formed, i.e., a "slipstream" is produced, thus, ensuring the formation of a robust flame kernel and a decrease in the multiple breakthroughs during ignition, with the result that erosion of the electrode is minimized, so that the wear and tear is reduced, and the life of the pre-chamber spark plug is maximized.

Furthermore, it is conceivable that the center electrode is made of platinum or iridium or is coated with platinum or iridium. With respect to the specific design of the center electrode, said center electrode can be designed as at least one strip, preferably as two cross-shaped or x-shaped strips, with curved ends, where in this case the surface of each of the curved ends forms an igniting surface, which corresponds to an igniting surface of the ground electrode—the cam. This design makes it possible to manufacture the center electrode in a particularly simple way, because the strip can be produced in a stamping operation. Then the strip can be deformed. In the specific case the ends of a substantially round or circular center section can extend on both sides in the radial direction. In the end region the ends may be curved in an arc shape in order to gradually, almost like a hyperbole, approach the cam of the ground electrode.

As an alternative, it is conceivable that the center electrode has at least two arms, in particular, is designed in a cross shaped manner with at least four arms. At the same time the arms can extend in the radial direction starting from a center point. The ends of the arms may be curved in an arc shape and approach the ground electrode or, more specifically, the cam that is used as the igniting surface.

BRIEF DESCRIPTION OF THE FIGURES

At this point there are a number of ways to advantageously embody and further develop the teaching of the present invention. For this purpose reference is made, on the one hand, to the claims subordinate to claim 1 and, on the other hand, to the following explanation of some preferred exemplary embodiments of the invention by means of the drawings. In conjunction with the explanation of the preferred exemplary embodiments of the invention by means of the drawings, generally preferred embodiments and further developments of the teaching are also explained. In the drawings FIG. 1 shows an exemplary embodiment of a pre-chamber spark plug, according to the invention, in a partial sectional view, FIG. 9 shows a center electrode in the form of a strip of an inventive pre-chamber spark plug in a variety of views.

DETAILED DESCRIPTION OF VARIOUS EMBODIMENTS

Figure 3:
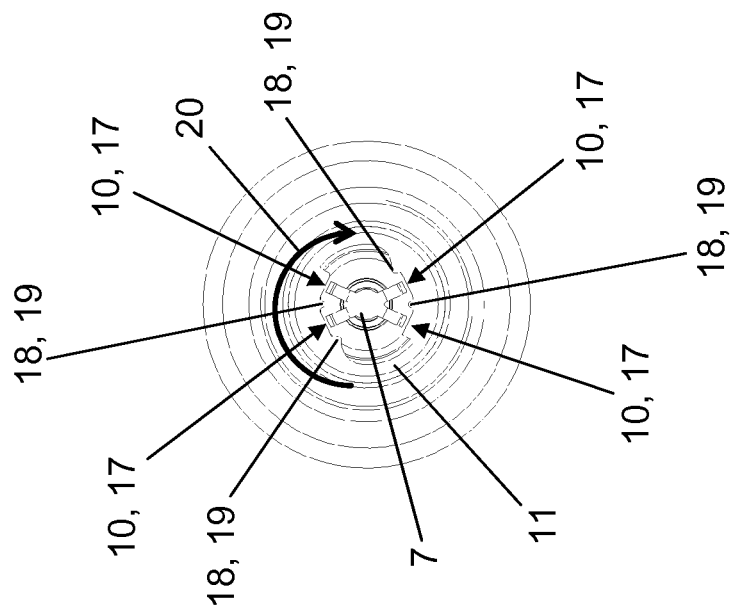
FIG. 3 shows another exemplary embodiment of an inventive pre-chamber spark plug with a ground electrode from FIG. 3 in a sectioned plan view.

FIG. 1 shows an exemplary embodiment of a pre-chamber spark plug of the invention in a partial sectional view. The pre-chamber spark plug has a spark plug body 1, which comprises a pre-chamber housing 2 and a cap 4 that closes the pre-chamber 3 at least partially. An external thread 5 is formed on the outer periphery of the pre-chamber housing 2. In addition, an insulator 6, which is partially depicted as well in FIG. 1, is disposed in the pre-chamber housing 2.

The pre-chamber spark plug has a center electrode 7 inside the pre-chamber 3. This center electrode is designed in the form of a strip 8 with ends 9 that are curved in an arc shape. In the exemplary embodiment depicted herein, the strip 8 has two ends 9, each acting as an igniting surface 10. In this case the strip 8 is made of an iridium alloy or a platinum alloy.

Furthermore, a ring-shaped ground electrode 11 is fixed to the pre-chamber housing 2 by means of a weld seam 12. The ground electrode 11 is made of nickel or a nickel-based alloy. The connection between the ground electrode 11 and the pre-chamber housing 2 can be produced by means of a conventional welding method, such as, for example, a TIG, plasma or laser welding method. As an alternative or in addition, the ground electrode 11 can be screwed or pressed into the pre-chamber housing 2.

The cap 4 that closes the pre-chamber 3 at least partially is designed so as to be cup shaped and has a circumferential collar 13 in the contact area with the pre-chamber housing 2. For propagation of the flame front, there is an opening 14 on the end of the cap 4 facing away from the electrodes. The cap 4 is fixed on the pre-chamber housing 2 by means of another weld seam 15.

At this point it should be noted that the reference numerals have been omitted to some extent in FIGS. 2 to 9 for the sake of greater clarity.

Figure 2:
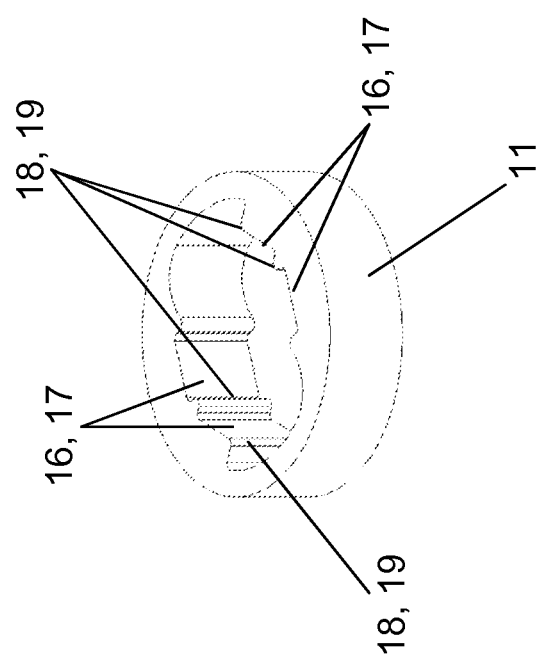
FIG. 2 shows a first exemplary embodiment of a ground electrode, according to the invention, in a perspective view.

FIG. 2 shows a first exemplary embodiment of a ground electrode 11 of the invention in a perspective view. The ground electrode 11 is designed so as to be ring shaped and has an outside diameter, which corresponds to approximately the inside diameter of the pre-chamber housing 2 in the area, in which the ground electrode 11 is disposed. The ring-shaped design of the ground electrode 11 leads to a targeted reduction in the inside diameter of the pre-chamber 3 in the area of the ignition, as a result of which the swirl and the flow velocity of the air/fuel mixture are increased. Once the flame kernel is formed, a much faster flame propagation is obtained, an aspect that gives rise to an improvement in the efficiency of the pre-chamber spark plug of the invention.

The ground electrode 11 has igniting surfaces 17, designed as four cams 16, on the inner lateral surface. Furthermore, radially inwards extending projections 18 are disposed as a flow shield 19 on the inner lateral surface of the ground electrode 11. In this case it is clear from FIG. 2 that the projections 18 have an asymmetrical, spoiler-like geometry.

FIG. 3 shows another exemplary embodiment of an inventive pre-chamber spark plug with a ground electrode 11 from FIG. 2 in a sectioned plan view.

In this view it is easy to see the four pairs of igniting surfaces that are formed by the igniting surfaces 10 of the center electrode 7 and the igniting surfaces 17 of the ground electrode 11. Furthermore, the swirl direction of the fuel/air mixture inside the pre-chamber 3 is shown by the arrow 20. Thus, it becomes clear that the projections 18, forming the flow shield 19, are formed, when seen in the swirl direction, upstream of the cam 16. The result is that a targeted reduction in the flow velocity of the fuel/air mixture in the area of the spark formation, i.e., the igniting surfaces 10, 17, is achieved; and, thus, a robust flame kernel formation and a decrease in the multiple breakthroughs during ignition are ensured.

Figure 4:
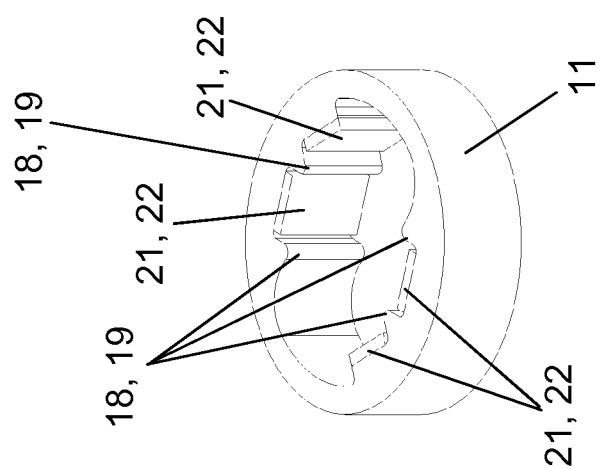
FIG. 4 shows a second exemplary embodiment of a ground electrode, according to the invention, in a perspective view.

FIG. 4 shows a second exemplary embodiment of a ground electrode 11 of the invention in a perspective view. The ground electrode 11 corresponds to the ground electrode 11, shown in FIG. 2; and, in addition, a reinforcement 21 made of precious metal, for example, platinum, iridium or a platinum-based alloy or an iridium-based alloy is provided on the cam 16. The reinforcement 21 is designed as a plate 22, which is disposed on the cam 16. In the specific case the plate 22 may be welded to the cam 16.

Figure 5:
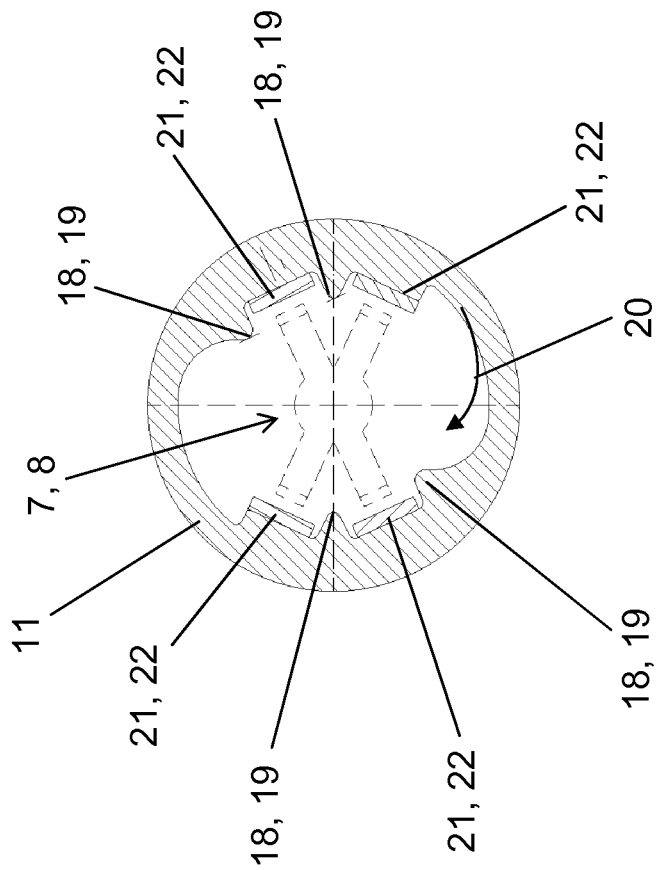
FIG. 5 shows the ground electrode from FIG. 4 in a plan view.

FIG. 5 shows the ground electrode 11 from FIG. 4 in a plan view. In this case it is very easy to see once again that each of the cams 16 of the ring-shaped ground electrode 11 has a plate 22 as the reinforcement 21, so that the plates 22 form the igniting surface 17 of the ground electrode 11. Since the precious metal of the reinforcement 21 has a higher melting point than the nickel or the nickel-based alloy of the ring-shaped ground electrode 11, the life of the pre-chamber spark plug increases significantly.

Figure 6:
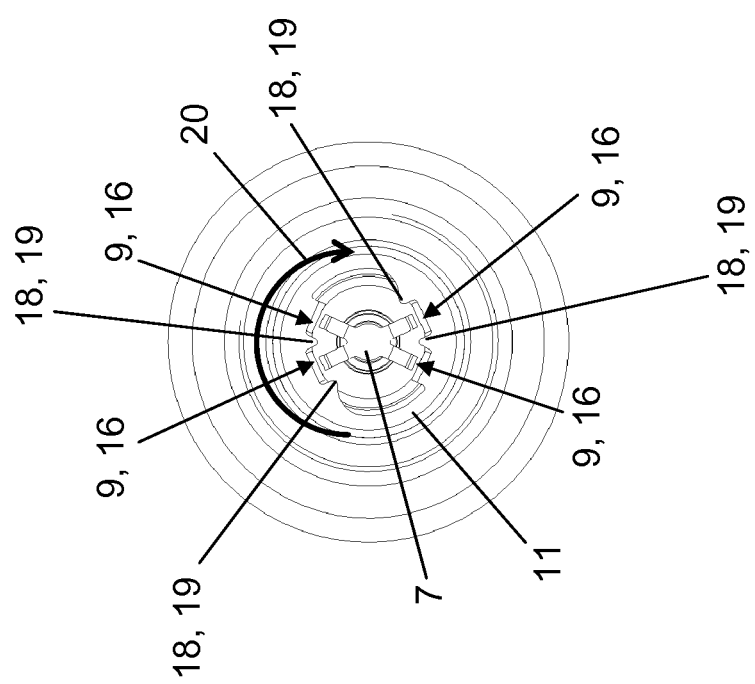
FIG. 6 shows an exemplary embodiment of an inventive pre-chamber spark plug with a ground electrode from FIG. 4 in a sectioned plan view.

FIG. 6 shows an exemplary embodiment of an inventive pre-chamber spark plug with a ground electrode 11 from FIG. 4 in a sectioned plan view. Since the ground electrode 11, shown in FIGS. 4 to 6, corresponds to the ground electrode 11, shown in FIGS. 2 and 3, reference is made to the relevant explanations, in particular, regarding the flow shield 19, in order to avoid repetition.

Figure 7:
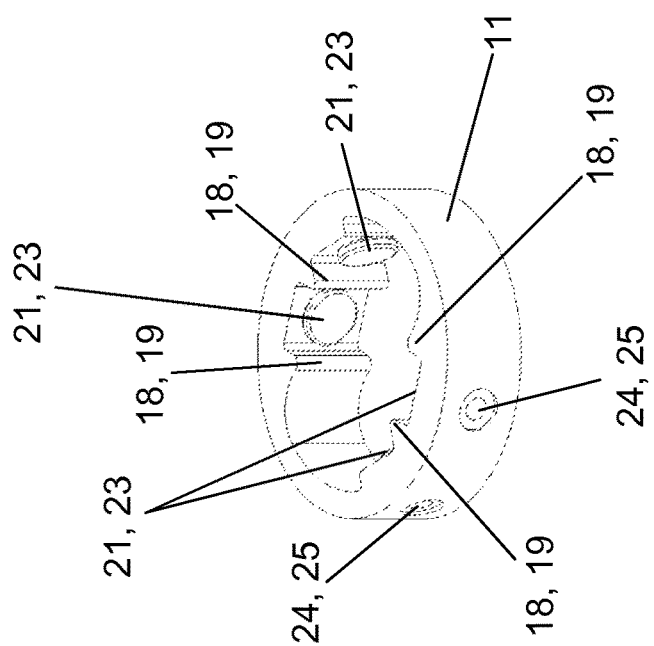
FIG. 7 shows a third exemplary embodiment of a ground electrode, according to the invention, in a perspective view.

FIG. 7 shows a third exemplary embodiment of a ground electrode 11 of the invention in a perspective view. The ring-shaped ground electrode 11 corresponds to the ground electrode 11 shown in FIG. 2, where in this case the reinforcement 21 is achieved in the form of a rivet 23. The rivet 23 is disposed in a passage 24 of the ground electrode 11 and is fixed by means of a spot weld 25 disposed on the outer lateral surface of the ground electrode 11. This design is characterized by a particularly simple and secure fixing of the rivet 23 to the ring-shaped ground electrode 11.

Figure 8:
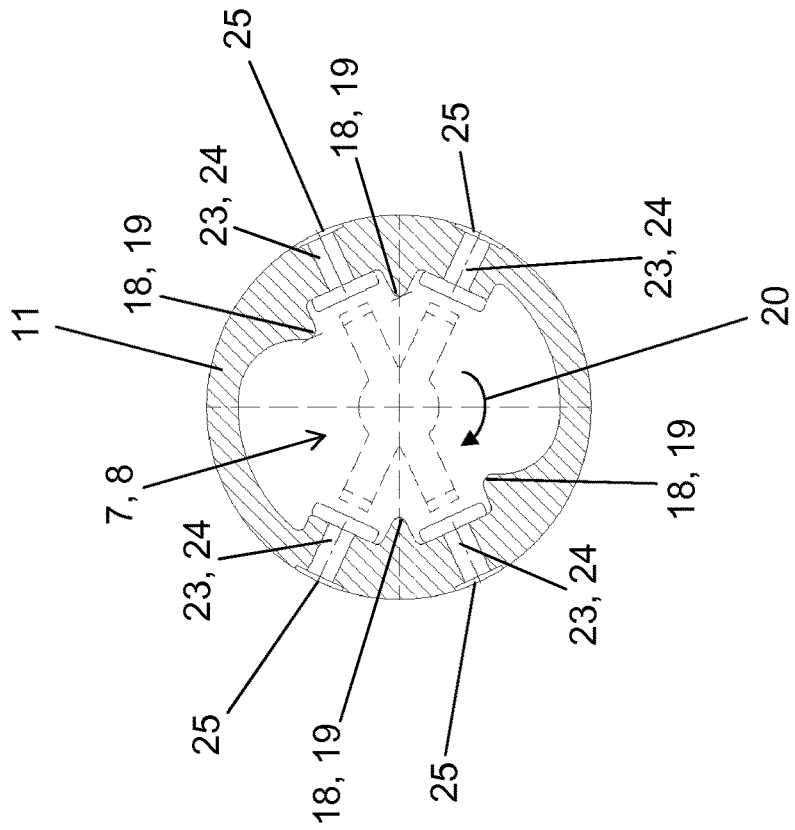
FIG. 8 shows the ground electrode from FIG. 7 in a plan view.

FIG. 8 shows the ground electrode 11 from FIG. 7 in a plan view. In this case it is easy to see the passage 24, in which the rivet 23 is disposed. Furthermore, the spot weld 25, which is disposed on the outer lateral surface of the ground electrode 11, is shown. Otherwise, the ground electrode 11, shown in FIGS. 7 and 8, corresponds to the ground electrode 11, shown in FIGS. 2 and 3, so that further explanations, in particular, with regard to the flow shield 19, are unnecessary on account of the description relating to it in this respect.

FIG. 9 shows a center electrode 7 in the form of a strip 8 of a pre-chamber spark plug of the invention in a variety of views. The drawing on the left in FIG. 9 shows the strip 8, as it can be produced, for example, in a simple manner in a punching process. The strip 8 has a round or circular center section 26, from which the two ends 9 extend in the radial direction. The two drawings on the right hand side in FIG. 9 show the strip 8 in the already deformed state, as it is welded to that section of the center electrode 7 that projects from the insulator 6. The arc-shaped ends 9 enclose with the center section 26 of the strip 8 an angle that is greater than 90 deg. in the pre-finished deformed state. In this respect an angle of 96 deg.+/−1 deg. has been found to be particularly advantageous, so that in the case of the inventive ring-shaped embodiment of the ground electrode 11 the entire pre-chamber spark plug is extremely simple in design and exhibits ideal igniting characteristics.

With respect to other advantageous embodiments of the inventive device reference is made to the general part of the specification and the appended claims in order to avoid repetition.

Finally it is explicitly pointed out that the above described exemplary embodiments of the inventive device are used only to explain the claimed teaching, but do not restrict the claimed teaching to the exemplary embodiments.

LIST OF REFERENCE NUMERALS 1 spark plug body
2 pre-chamber housing
3 pre-chamber
4 cap
5 external thread
6 isolator
7 center electrode
8 strip
9 end
10 igniting surface (center electrode)
11 ground electrode
12 weld seam
13 collar
14 opening
15 weld seam
16 cam
17 igniting surface (ground electrode)
18 projection
19 flow shield
20 swirl direction
21 reinforcement
22 plate
23 rivet
24 passage
25 spot weld
26 center section

The invention claimed is:

1. Pre-chamber spark plug for igniting a fuel-air mixture in an internal combustion engine, the pre-chamber spark plug comprising:
 a spark plug body having a pre-chamber housing and a cap, the cap being configured to at least partially close the pre-chamber;
 a ground electrode disposed in the spark plug body; and a center electrode projecting into the pre-chamber,
wherein:
the ground electrode is ring shaped and has, on an inner lateral surface of the ground electrode, at least one igniting surface configured as a cam, and a radially inwards extending protrusion configured as a flow shield; and
the radially inwards extending protrusion is formed, when viewed in a swirl direction of the fuel-air mixture inside the pre-chamber, upstream of the cam.

2. The pre-chamber spark plug of claim 1, wherein the ground electrode is made of nickel or a nickel-based alloy or is coated with nickel or a nickel-based alloy.

3. The pre-chamber spark plug of claim 1, wherein the ground electrode is connected to the pre-chamber housing in either a positive or a non-positive manner.

4. The pre-chamber spark plug claim 3, wherein the ground electrode is at least one of welded, pressed, shrunk, or screwed into the pre-chamber housing.

5. The pre-chamber spark plug of claim 1, wherein a reinforcement made of precious metal is disposed on the cam.

6. The pre-chamber spark plug of claim 5, wherein the reinforcement is designed as a plate, wherein the plate is connected to the cam in either a positive or a non-positive manner.

7. The pre-chamber spark plug of claim 5, wherein the reinforcement is designed as a rivet, wherein the rivet is disposed in a passage of the ground electrode in either a positive or a non-positive manner.

8. The pre-chamber spark plug of claim 7, wherein the rivet is pressed or shrunk into the passage.

9. The pre-chamber spark plug of claim 7, wherein the rivet is fixed by means of a spot weld disposed on the outer lateral surface of the ground electrode.

10. The pre-chamber spark plug of claim 5, wherein the precious metal is at least one of platinum, iridium, a platinum-based alloy, or an iridium-based alloy.

11. The pre-chamber spark plug of claim 5, wherein the reinforcement is designed as a plate, wherein the plate is welded to the cam in either a positive or a non-positive manner.

12. The pre-chamber spark plug of claim 1, wherein the protrusion has an asymmetric geometry.

13. The pre-chamber spark plug of claim 12, wherein the asymmetric geometry is a spoiler-like geometry.

14. The pre-chamber spark plug of claim 1, wherein the center electrode is made of platinum or iridium.

15. The pre-chamber spark plug of claim 1, wherein the center electrode is designed as at least one strip with curved ends, wherein the surface of each of the curved ends forms an igniting surface.

16. The pre-chamber spark plug of claim 15, wherein the at least one strip comprises two cross-shaped strips.

17. The pre-chamber spark plug of claim 1, wherein the internal combustion engine is a gasoline engine.

18. The pre-chamber spark plug of claim 15, wherein the at least one strip comprises x-shaped strips.

19. The pre-chamber spark plug of claim 1, wherein the center electrode is coated with platinum or iridium.

20. Pre-chamber spark plug for igniting a fuel-air mixture in an internal combustion engine, the pre-chamber spark plug comprising:
a spark plug body having a pre-chamber housing and a cap, the cap being configured to at least partially close the pre-chamber;
a ground electrode disposed in the spark plug body; and
a center electrode projecting into the pre-chamber,
wherein the ground electrode is ring shaped and has, on an inner lateral surface of the ground electrode, at least one igniting surface configured as a cam, and a radially inwards extending protrusion, the protrusion being configured as a flow shield and having an asymmetric geometry.

* * * * *